United States Patent
Hamburgen et al.

(10) Patent No.: US 9,019,207 B1
(45) Date of Patent: Apr. 28, 2015

(54) SPACEBAR INTEGRATED WITH TRACKPAD

(75) Inventors: William Hamburgen, Palo Alto, CA (US); Frank Hislop, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 41 days.

(21) Appl. No.: 13/073,514

(22) Filed: Mar. 28, 2011

Related U.S. Application Data

(60) Provisional application No. 61/387,287, filed on Sep. 28, 2010.

(51) Int. Cl.
*G06F 3/033* (2013.01)
*G09G 5/08* (2006.01)
*G06F 3/0488* (2013.01)

(52) U.S. Cl.
CPC .................................. *G06F 3/0488* (2013.01)

(58) Field of Classification Search
USPC ......... 345/163, 173–183, 156–158, 167, 168; 715/764, 856–862
See application file for complete search history.

(56) References Cited

U.S. PATENT DOCUMENTS

| | | | |
|---|---|---|---|
| 2008/0084387 A1* | 4/2008 | McArdle | 345/158 |
| 2008/0266143 A1* | 10/2008 | Ohshita et al. | 341/22 |
| 2009/0322687 A1* | 12/2009 | Duncan et al. | 345/173 |
| 2010/0164880 A1* | 7/2010 | Huang et al. | 345/173 |

* cited by examiner

*Primary Examiner* — Kevin M Nguyen
*Assistant Examiner* — Insa Sadio
(74) *Attorney, Agent, or Firm* — Brake Hughes Bellermann LLP

(57) ABSTRACT

An apparatus includes a keyboard and a trackpad, where a spacebar for the keyboard is integrated as a part of the trackpad.

30 Claims, 7 Drawing Sheets

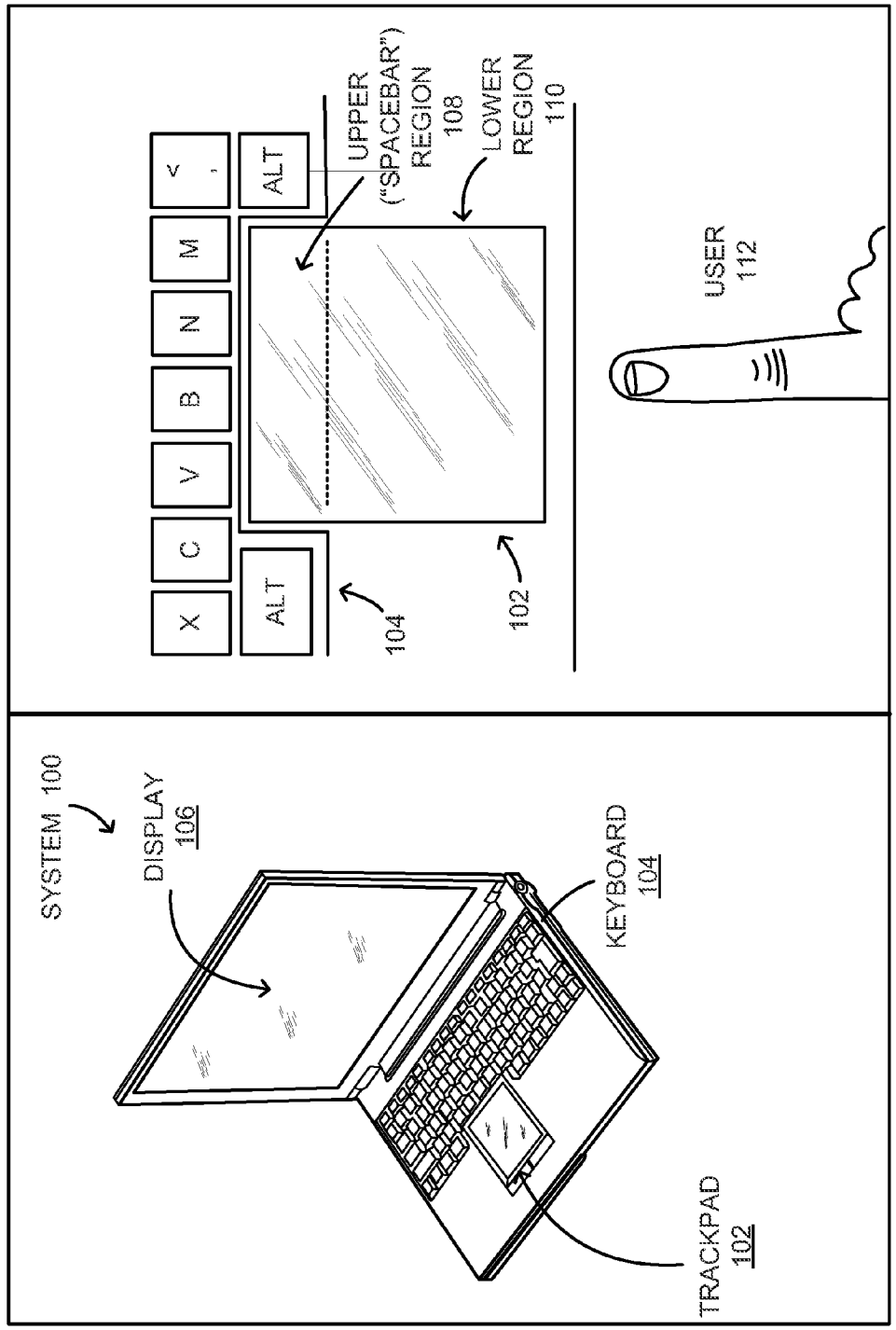

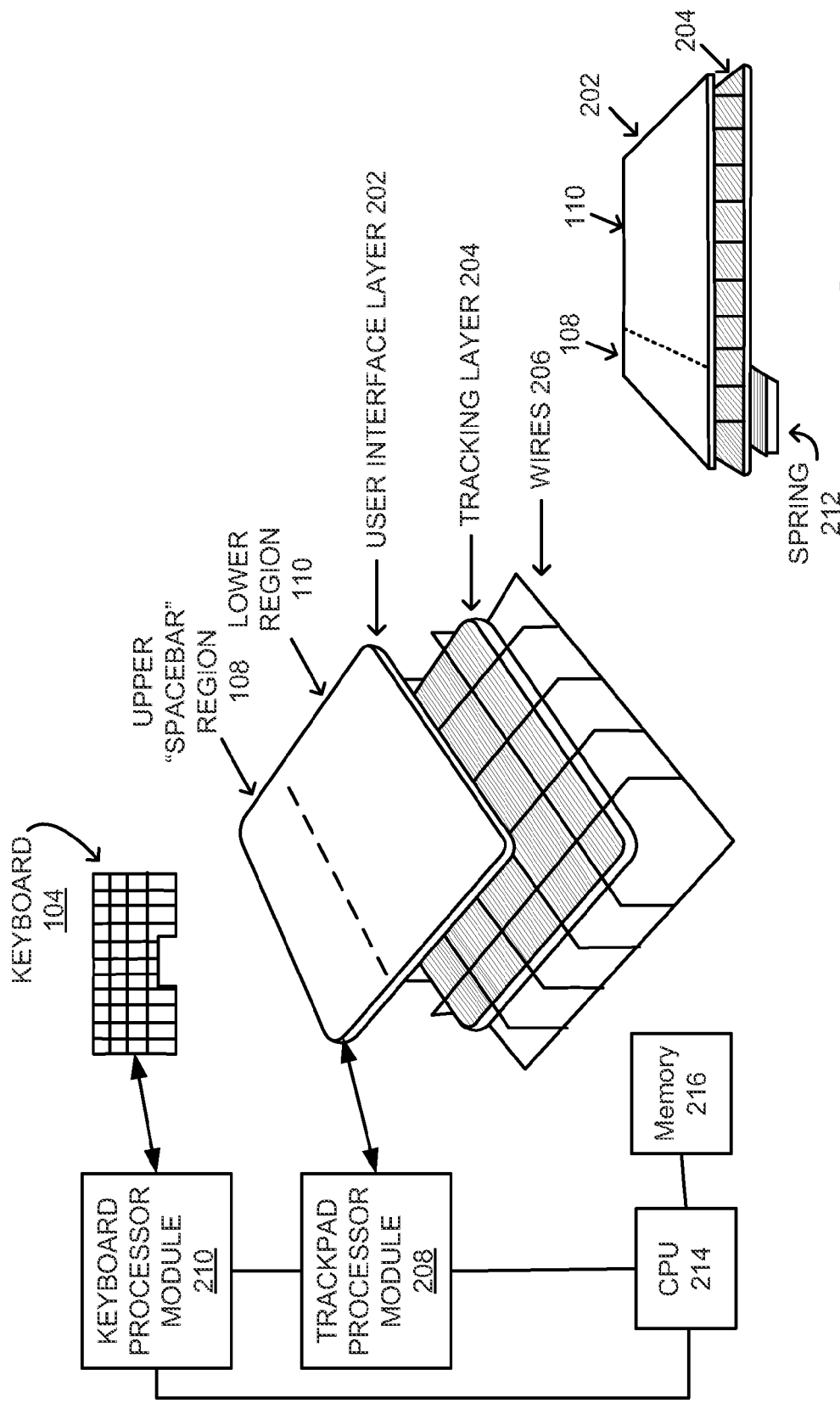

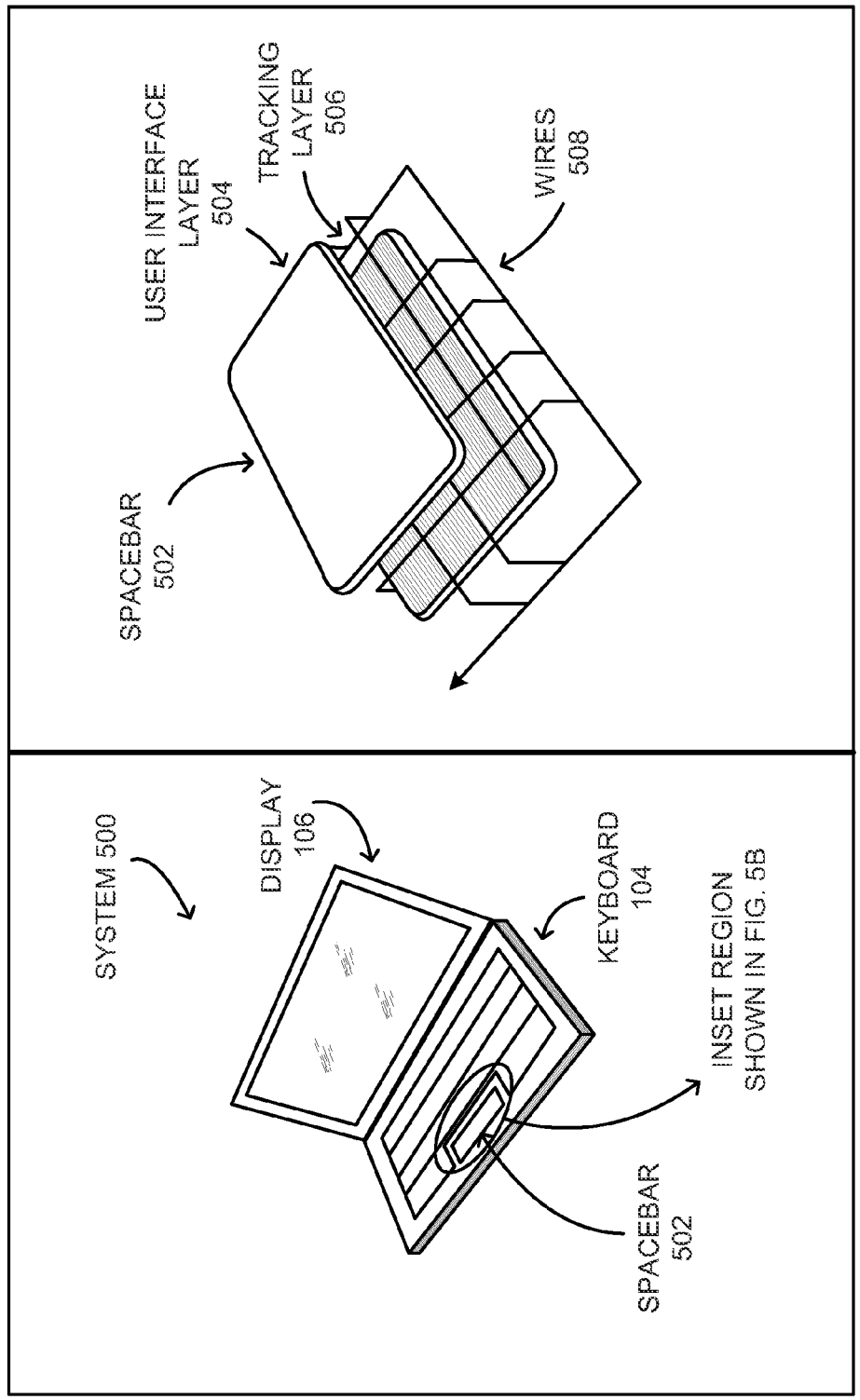

SPACEBAR INTEGRATED WITH TRACKPAD

CROSS REFERENCE TO RELATED APPLICATIONS

This application claims the benefit of U.S. Provisional Application No. 61/387,287, filed Sep. 28, 2010, entitled "Spacebar Integrated With Trackpad," which is hereby incorporated by reference in its entirety.

TECHNICAL FIELD

This description relates to acquiring user input for computing devices.

BACKGROUND

Computing devices typically use user input to perform desired computing tasks. User input can be supplied in various forms. Typically, user input comes either in the form of characters such as, for example, letters, numbers or other characters entered by typing on a keyboard, or in the form of touch input gestures such as, for example, scrolling cursor movements, clicks and other gestures entered by touching a trackpad, moving a mouse, or interacting with another touch- or motion-sensitive device or area.

Computing devices often include at least two distinct means of gathering these two primary forms of user input: For example, a portable computer may include both a keyboard and a trackpad, in addition to its display, processor and other hardware. The keyboard is configured for character entry and to perform shortcut commands via keystroke. The trackpad is configured to control cursor movement, and for scrolling, selecting items, and inputting other control gestures. Other touch devices, such as an external mouse, can in some cases be connected to the computer to duplicate or to supplement trackpad function; however, it may be typical to interact with portable computers primarily via the included trackpad.

Computers, particularly portable computing devices, have decreased dramatically in size in recent years. As such, space is at a premium and efficient allocation of space on device surfaces is increasingly important.

To operate software on a portable computer, a user generally interacts with both the keyboard and the trackpad. Normal typing on the keyboard typically occupies both of the user's hands, and using the trackpad requires the use of at least one hand.

The keyboard includes a plurality of keys, representing letters (e.g., Q, W, E, R, T, Y), numbers (e.g., 1, 2, 3), characters and symbols (e.g., Space, #, $, %) and functions (e.g. Ctrl, Esc, Shift). The spacebar key is typically positioned at the bottom center of the keyboard area, and its normal function during typing is to insert a blank space character, for example, to delineate boundaries between words.

The trackpad is a touch-sensitive surface on which the user can enter input. For example, depending on the computing context, the user may tap one or more fingertips on the surface of the trackpad, or place one or more fingertips on the surface and drag them in a particular pattern. The trackpad also may have separate buttons duplicating the clickable buttons on a mouse, or it may be clickable anywhere on its surface, or both. Other names for the trackpad include, for example, the touchpad, the track pad, and the touch pad.

Many computing applications may require the user to use both the keyboard and the trackpad, often switching rapidly between them. For example, in a word processing application, the user may type to enter text using the keyboard, and then wish to insert text into an earlier passage in the document. Using the trackpad, the user could scroll the cursor to the desired location in the document and click to position the cursor. The user could then switch to the keyboard and type the desired text, before scrolling back to the original position using the trackpad, clicking, and continuing to type. Such parallel use of trackpad and keyboard is common in many computing applications, such as, for example, web browsing, spreadsheets, word processing, e-mail programs, presentation managers, and photo and video editing software.

SUMMARY

In one general aspect, an apparatus includes a keyboard and a trackpad, where a spacebar for the keyboard is integrated as a part of the trackpad.

Implementations may include one or more of the following features. For example, at least a portion of the trackpad may be configured to function as the spacebar. A portion of the trackpad may extend into a region for the spacebar on the keyboard and the portion of the trackpad may be configured to function as the spacebar. A top portion of the trackpad may be profiled to simulate a shape of the spacebar. A top portion of the trackpad may extend into a region of the keyboard for the spacebar and may include a switch set that is configured to function as the spacebar. A bottom edge of the trackpad may include a first switch that is configured to function as a left mouse button and a second switch that is configured to function as a right mouse button.

The trackpad may include one or more spring mechanisms. The one or more spring mechanisms may be positioned beneath a portion of the trackpad that is configured to function as the spacebar.

The trackpad may include a boundary delineating a top portion of the trackpad from a bottom portion of the trackpad. The boundary may include a visual indicator. The boundary may include a tactile indicator. The boundary may include a shelf. The boundary may include a ridge. The boundary may include a groove.

The apparatus may include one or more processors configured to process input from the keyboard and the trackpad. The apparatus may include a keyboard controller module and a trackpad controller module, where the keyboard is connected to the keyboard controller module and the trackpad is connected to the trackpad controller module. The keyboard may be configured without a key for the spacebar.

In another general aspect, an apparatus may include a keyboard including a spacebar, where the spacebar is configured to function as at least a portion of a trackpad.

Implementations may include one or more of the following features. For example, the apparatus may include one or more processors configured to process input from the keyboard and the spacebar.

In another general aspect, a method includes executing instructions recorded on a non-transitory computer-readable storage media using at least one processor. The method includes obtaining an input from a user via a trackpad, determining a context of the trackpad input and characterizing the trackpad input as either a spacebar keystroke or a trackpad gesture based at least in part on the determined context of the trackpad input.

Implementations may include one or more of the following features. For example, the trackpad gesture may include a tracking gesture. The trackpad gesture may include a click gesture. Determining the context of the trackpad input may include determining whether the trackpad input contacted a spacebar region of the trackpad. Determining the context of the trackpad input may include determining whether the trackpad input included a tap motion, a sliding motion or a combination of the tap motion and the sliding motion. Determining the context of the trackpad input may include determining whether the trackpad input activated a spring mechanism in the trackpad. Determining the context of the trackpad input may include determining whether the trackpad input included a continuous pressure on the trackpad. Determining the context of the trackpad input may include determining an application context of the trackpad input. Determining the context of the trackpad input may include determining a text entry context of the trackpad input. Determining the context of the trackpad input may include determining a duration of the trackpad input.

In another general aspect, a recordable storage medium has recorded and stored thereon instructions that, when executed, perform the actions of obtaining an input from a user via a trackpad, determining a context of the trackpad input and characterizing the trackpad input as either a spacebar keystroke or a trackpad gesture based at least in part on the determined context of the trackpad input.

Implementations may include one or more of the following features. For example, the trackpad gesture may include a tracking gesture. The trackpad gesture may include a click gesture. Determining the context of the trackpad input may include determining whether the trackpad input contacted a spacebar region of the trackpad. Determining the context of the trackpad input may include determining whether the trackpad input included a tap motion, a sliding motion or a combination of the tap motion and the sliding motion. Determining the context of the trackpad input may include determining whether the trackpad input activated a spring mechanism in the trackpad. Determining the context of the trackpad input may include determining whether the trackpad input included a continuous pressure on the trackpad. Determining the context of the trackpad input may include determining an application context of the trackpad input. Determining the context of the trackpad input may include determining a text entry context of the trackpad input. Determining the context of the trackpad input may include determining a duration of the trackpad input.

The details of one or more implementations are set forth in the accompanying drawings and the description below. Other features will be apparent from the description and drawings, and from the claims.

BRIEF DESCRIPTION OF THE DRAWINGS

FIG. 1A is an exemplary block diagram of a system for acquiring user input for a computing device by means of a keyboard integrated with a trackpad.

FIG. 1B is an exemplary diagram of the inset of FIG. 1A.

FIG. 2A is a diagram of an implementation of the system of FIG. 1A.

FIG. 2B is an exemplary diagram of an implementation of the system of FIG. 1A, depicting an implementation with a spring.

FIG. 5A is an exemplary diagram of a system for acquiring user input for a computing device.

FIG. 5B is an exemplary diagram of the inset of FIG. 5A.

DETAILED DESCRIPTION

Figure 3C:
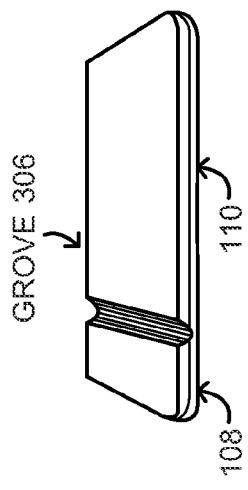
FIGS. 3A-3F are exemplary diagrams of possible implementations of the system of FIG. 1A, depicting various ways to delineate the spacebar region on the trackpad.

FIG. 1A is an exemplary diagram of a system 100 for acquiring user input for a computing device by means of a keyboard 104 comprising a region for a spacebar, integrated with a trackpad 102 that is configured to control movement of a cursor on a display 106. In FIG. 1A, the system 100 integrates the trackpad with a portion of the keyboard, in particular with the spacebar key. Merging the spacebar and a region of the trackpad into a single area is space-efficient, and moreover saves effort on the part of the user by, for example, obviating the need to physically move between the keyboard and the trackpad.

FIG. 1B depicts the inset from FIG. 1A, depicting the exemplary system of FIG. 1A in further detail.

The system 100 includes a trackpad 102. The trackpad 102 may be configured, for example, to control navigation on the display 106 including controlling the movement of a cursor or other pointer on the display 106. For example, the trackpad 102 may be configured to scroll the cursor between icons on the display and to select an icon corresponding to a desired application. The trackpad 102 also may be configured to perform other one-finger and multi-finger functions including pointing and input-related functions such as, for example, selecting, deselecting, copying, cutting, pasting, tapping, clicking, dragging, drawing, pinching, swiping, rotating, zooming and other functions.

The system 100 includes a keyboard 104. The keyboard 104 may be configured, for example, to enter text or characters in the context of a software application. For example, the keyboard 104 may be configured to type words in a document in a word processing application. In this example implementation, the keyboard 104 does not include a spacebar.

In the system 100, the trackpad 102 is integrated with the keyboard 104 such that the region of the keyboard 104 normally comprising the spacebar includes a portion of the trackpad 102, which may be referred to as an upper region or the spacebar region 108. The portion of the trackpad 102 that extends into or occupies the portion of the keyboard normally reserved for the spacebar is the spacebar region 108 of the trackpad 102. Any portion of the trackpad not occupying the spacebar region may be referred to as the lower region 110.

The upper spacebar region 108 of the trackpad 102 may be configured, for example, both as a trackpad and as a spacebar key. For example, a user 112 may utilize the entire trackpad surface 102 including the spacebar region 108 for mousing operations, cursor movement, selection of objects, etc., by using a one finger or multiple fingers to interact with the trackpad 102, and may also use the spacebar region 108 of the trackpad 102 as a spacebar by applying, for example, a keystroke motion to this region 108.

The lower region 110 of the trackpad 102 may function, for example, as a typical trackpad. For example, a user 112 may utilize the entire trackpad surface 102 including the lower region 110 for navigation, pointing and input-related functions such as, for example, selecting, deselecting, copying, cutting, pasting, tapping, clicking, dragging, drawing, pinching, swiping, rotating, zooming and other functions by using one or more fingertips to interact with the trackpad 102.

Other possible implementations of the system 100 exist other than that depicted in FIG. 1A, such as an example implementation in which the entire trackpad 102 may function as both the spacebar and the trackpad. In this example implementation, the entire trackpad region 102 may be configured to function equivalently to the upper region 108 described above. For example, a user 112 could enter spacebar keystrokes or trackpad gestures (e.g., click gestures and tracking gestures) to any portion of the trackpad 102, and the system 100 would, as described in further detail below, determine whether to handle the input as a spacebar keystroke or as trackpad input.

FIG. 2A is a diagram of an implementation of the system of FIG. 1A, depicting components of the system 100. As noted above, the system 100 includes a keyboard 104 and trackpad 102, and the trackpad 102 includes a region that occupies or extends into the region of the keyboard 104 normally reserved for the spacebar key. This region is the upper "spacebar" region 108 of the trackpad 102, and any other region not occupying the spacebar area is the lower region 110.

The system 100 may also include a central processing unit (CPU) 214 and a memory 216. The CPU 214 may be configured, for example, to handle the processing needs of the system 100. For example, the CPU 214 may handle instructions pertaining to operating system function, system management, software program execution and interfaces between system components. The memory 216 may be implemented as a non-transitory storage medium and may be configured to store instructions for execution by the CPU 216, including firmware, operating system instructions and instructions relating to the functioning of the trackpad 102 and the keyboard 104. The memory 216 also may be configured to store tracking and history information related to trackpad 102 and keyboard 104 inputs.

The system 100 may also include a keyboard processor module 210. The keyboard processor module 210 may be configured, for example, to process keystrokes and input from the keyboard and send the processed input to the CPU 214. For example, the keyboard processor module 210 may be configured to interpret a series of keystrokes input by the user 112, recognize the characters corresponding to the keys pressed, and transmit this string of characters to the CPU 214.

The system 100 may also include a trackpad processor module 208. The trackpad processor module 208 may be configured, for example, to process input from the trackpad and send the processed input to the CPU 214. For example, the trackpad processor module 208 may be configured to interpret a series of gestures, taps, clicks, or a combination thereof input by the user 112 to the trackpad 102, recognize the input and transmit it to the CPU 214.

The trackpad 102 includes a spacebar region 108 and may include a lower region 110, and may also be comprised of several layers as shown in FIG. 2A.

In the example implementation shown in FIG. 2A, a user interface layer 202 comprises the surface of the trackpad 102, and is the layer that the user touches in order to enter an input to the trackpad 102. For example, the user (e.g., user 112 of FIG. 1) may tap the user interface layer 202 with a fingertip and/or slide one or more fingertips across the user interface layer 202. In this example implementation, the user interface layer 202 may be composed of glass, plastic, composite or any other material suitable for a trackpad 102 surface.

In the same example implementation shown in FIG. 2A, a tracking layer 204 sits beneath the user interface layer 202, and may include wires 206 to carry one or more signals corresponding to touch inputs provided by the user (e.g., user 112 of FIG. 1). The tracking layer 204 may be used, for example, to capture user input applied to the user interface layer 202, and convert the input to one or more signals to be used by the system in order to record, process and handle user input. Other implementations of the tracking layer 204 are possible, such as, for example, a tracking layer 204 not utilizing wires 206, but instead tracking user touch inputs by other means.

Wires 206, if present in the implementation, may be organized in a grid or crossbar pattern as shown in the example implementation in FIG. 2A, or in another pattern suitable for capturing user input on the user interface layer 202. For example, wires 206 may also be oriented in a spiral pattern, a triangular or other regular grid pattern, an irregular grid pattern, a pad array or another pattern.

In one possible implementation depicted in FIG. 2A, the trackpad 102 may be connected to the trackpad processor module 208. In this case, the trackpad processor module 208 may interpret the input from the trackpad 102, and in particular from the spacebar region 108, to determine, for example, whether a given input should be classified as a spacebar keystroke or a trackpad input. For example, a user (e.g., user 112 of FIG. 1) striking the spacebar region 108 of the trackpad 102 with a fingertip might intend for the strike to be interpreted as a spacebar keystroke, or as a tap on the trackpad 102. In this implementation, the trackpad processor module 208 may interpret the input according to, for example, the computing context in which the user is operating, or characteristics of the user's input gesture, or by other means. The trackpad processor module 208 also may be configured to ignore or reject spurious inputs such as, for example, one or more fingers resting on the trackpad 102.

In other possible implementations, distinguishing between spacebar keystrokes and trackpad input may be performed, for example, by the keyboard processor module 210, by the CPU 214 itself, by a combination of the trackpad processor module 208, the keyboard processor module 21 and the CPU 214, or by other means.

The trackpad 102 may also include one or more spring mechanisms 212 such as one or more springs. The spring or springs may be used, for example, to provide tactile feedback to register pressure in the form of a button-press or a keystroke when applied by the user 112 to a region of the trackpad 102 located above a spring mechanism 212. For example, a spring mechanism 212 could be positioned beneath the spacebar region 108 of the trackpad 102 to simulate to the user (e.g., user 112 of FIG. 1) the feeling of pressing and releasing a key when this region 108 is pressed.

Referring to FIG. 2B, a spring mechanism 212 is positioned beneath the spacebar region 108 of the trackpad 102, and situated beneath both the user interface layer 202 and the tracking layer 204. Other implementations are possible, including, for example, a spring mechanism 212 positioned under other regions of the trackpad 102 or the entire trackpad 102, a plurality of springs positioned under some or all of the trackpad 102, a spring mechanism 212 that is positioned outside the edge of the trackpad 102, spring mechanisms 112 at one or more corners or a spring mechanism 212 positioned between the user interface layer 202 and the tracking layer 204.

In the example implementation depicted in FIG. 2B, the spring mechanism 212 is not depicted as being connected to the trackpad processor module 208 or the keyboard processor module 210 or the CPU 214. In this implementation, the spring mechanism 212 may be used, for example, to provide tactile feedback to the user that a particular region of the trackpad 102 has been pressed, while actual handling of the input is performed as described above.

Other implementations are possible wherein the spring mechanism 212 is separately connected to the trackpad processor module 208 or the keyboard processor module 210 or the CPU 214. In such implementations, the spring mechanism 212 may be used, for example, to supply additional input to the trackpad processor module 208 or the keyboard processor module 210 or the CPU 214, regarding the location and the type of input supplied by the user to the trackpad 102, specifically to the region of the trackpad 102 connected to the spring mechanism 212.

FIGS. 3A-3F are exemplary block diagrams of possible implementations of the system of FIG. 1A, depicting various ways to delineate the spacebar region on the trackpad. A delineation between the spacebar region 108 and the lower region 110 may be used, for example, to inform or remind the user of the location of the spacebar region 108 of the trackpad 102. For example, the user 112 might notice a partition between the spacebar region 108 and the lower region 110 of the trackpad 102 and thus realize that, to enter a spacebar keystroke, the spacebar region 108 must be pressed.

FIGS. 3A-3F present several possible implementations of delineating the spacebar region 108 from the lower region 110 of the trackpad 102. These implementations include a visual indicator 302 applied to the trackpad 102, a raised ridge 304 applied to the trackpad 102, a groove 306 applied to the trackpad 102, a shelf 308, texture 310 and no delineation.

Figure 3B:
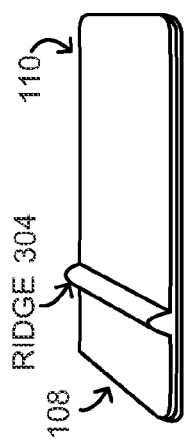
Figure 3A:
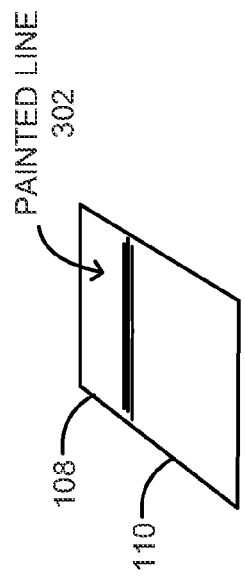
Figure 3F:
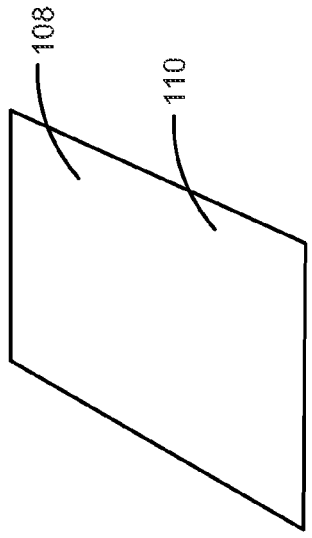

In one example implementation depicted in FIG. 3A, a visual indicator 302 may be applied to the trackpad 102 to delineate the spacebar region 108 from the lower region 110. The visual indicator 302 may be used, for example, to delineate for the user 112 the spacebar region 108 from the lower region 110 of the trackpad 102, and thus to inform the user at which position to interact with the trackpad 102 in order to input a spacebar keystroke. For example, a user 112 working in a word processing environment may wish to enter a space between words, and thus would seek to enter a spacebar keystroke; by looking at, for example, the visual indicator 302 on the surface of the trackpad 102, the user 112 would realize the boundary delineating the spacebar region 108 and would know to localize the input to that area in order to effect a spacebar keystroke.

In the implementation shown in FIG. 3A, the visual indicator is depicted as a painted line on the surface of the user interface layer 202. Other implementations of the visual indicator 302 are possible. For example, the visual indicator 302 may be a differently-colored or differently-tinted portion of the trackpad 102, or a marking on the trackpad 102 made using other ink, dye, liquid crystal display (LCD), or by other means. The visual indicator may also be a light, laser or image projected onto the surface of the trackpad 102, or displayed on the surface of the trackpad 102, or a marking, light, laser or image projected, displayed or affixed below the surface of the trackpad 102, for example to the tracking layer 204 if the user interface layer 202 is, for example, transparent or translucent.

In another example implementation depicted in FIG. 3B, the trackpad 102 may include a raised ridge 304 to delineate the spacebar region 108 from the lower region 110. The raised ridge 304 may be used, for example, to delineate for the user 112 the spacebar region 108 from the lower region 110 of the trackpad 102, and thus to inform the user at which position to interact with the trackpad 102 in order to input a spacebar keystroke. For example, a user 112 working in a word processing environment may wish to enter a space between words, and thus would seek to enter a spacebar keystroke; by feeling, for example, the raised ridge 304 on the surface of the trackpad 102, the user 112 would realize the boundary delineating the spacebar region 108 and would know to localize the input to that area in order to effect a spacebar keystroke.

In the implementation shown in FIG. 3B, the raised ridge 304 is depicted as a ridge on the surface of the user interface layer 202 of the trackpad 102, formed from the same material as the user interface layer 202. Other implementations of the raised ridge 304 are possible. For example, the raised ridge 304 may be a separate piece of material affixed to the surface of the user interface layer 202, or it may be a raised protrusion underneath the user interface layer 202 that can be felt through the user interface layer 202. The raised ridge 304 may also be a wire or other protrusion from the surface of the trackpad 102 or embedded in the surface of the trackpad 102, or a wire or channel carrying a current or signal capable of being sensed by the user's 112 fingertip. The raised ridge 304 may also consist of a region of differing texture from the surrounding regions of the user interface layer 202, or it may consist of the spacebar region 108 having a different texture than the lower region 110.

In another example implementation depicted in FIG. 3C, the trackpad 102 may include a groove 306 to delineate the spacebar region 108 from the lower region 110. The groove 306 also may be used, for example, to delineate for the user 112 the spacebar region 108 from the lower region 110 of the trackpad 102, and thus to inform the user at which position to interact with the trackpad 102 in order to input a spacebar keystroke. For example, a user 112 working in a word processing environment may wish to enter a space between words, and thus would seek to enter a spacebar keystroke; by feeling, for example, the groove 306 on the surface of the trackpad 102, the user 112 would realize the boundary delineating the spacebar region 108 and would know to localize the input to that area in order to effect a spacebar keystroke.

In the implementation shown in FIG. 3C, the groove 306 is depicted as a groove on the surface of the user interface layer 202 of the trackpad 102, an indentation in the same material as the user interface layer 202. Other implementations of the groove 306 are possible.

Figure 3E:
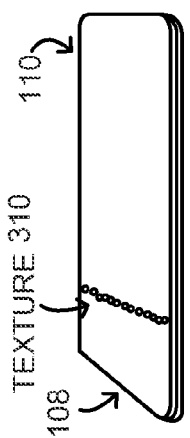
Figure 3D:
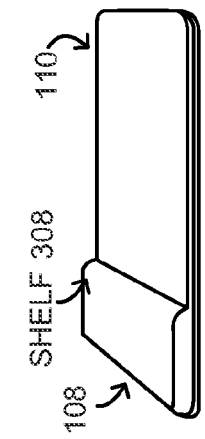

In another example implementation depicted in FIG. 3D, the trackpad 102 may include a shelf 308 to delineate the spacebar region 108 from the lower region 110. The shelf 308 may be used, for example, to delineate for the user 112 the spacebar region 108 from the lower region 110 of the trackpad 102, and thus to inform the user at which position to interact with the trackpad 102 in order to input a spacebar keystroke. For example, a user 112 working in a word processing environment may wish to enter a space between words, and thus would seek to enter a spacebar keystroke; by feeling, for example, the shelf 308 on the surface of the trackpad 102, the user 112 would realize the boundary delineating the spacebar region 108 and would know to localize the input to that area in order to effect a spacebar keystroke.

In the implementation shown in FIG. 3D, the shelf 308 is depicted as a shelf on the surface of the user interface layer 202 of the trackpad 102, formed from the same material as the user interface layer 202. Other implementations of the shelf 308 are possible. For example, the shelf 308 may be a separate piece of material affixed to the surface of the user interface layer 202, or it may be a raised protrusion underneath the user interface layer 202 that can be felt through the user interface layer 202. The shelf 308 may also consist of a region of differing texture from the surrounding regions of the user interface layer 202, or it may consist of the spacebar region 108 having a different texture than the lower region 110.

In another example implementation depicted in FIG. 3E, the trackpad 102 may include a texture 310 to delineate the spacebar region 108 from the lower region 110. The texture 310 may be used, for example, to delineate for the user 112 the spacebar region 108 from the lower region 110 of the trackpad 102, and thus to inform the user at which position to interact with the trackpad 102 in order to input a spacebar keystroke. For example, a user 112 working in a word processing environment may wish to enter a space between words, and thus would seek to enter a spacebar keystroke; by feeling, for example, the texture 310 on the surface of the trackpad 102, the user 112 would realize the boundary delineating the spacebar region 108 and would know to localize the input to that area in order to effect a spacebar keystroke.

In the implementation shown in FIG. 3E, the texture 310 is depicted as small circular bumps on the surface of the user interface layer 202 of the trackpad 102, formed from the same material as the user interface layer 202. Other implementations of the texture 310 are possible. For example, the texture 310 may be a "rough" line, pyramid bumps, other shaped bumps and any type of surface texture to distinguish from a smooth surface. While not depicted, more or all of the spacebar region 108 may be covered with a texture to distinguish from a smooth lower region 110.

In the final example implementation depicted in FIG. 3D, the trackpad 102 may include no indicator to delineate the spacebar region 108 from the lower region 110.

Figure 4A:
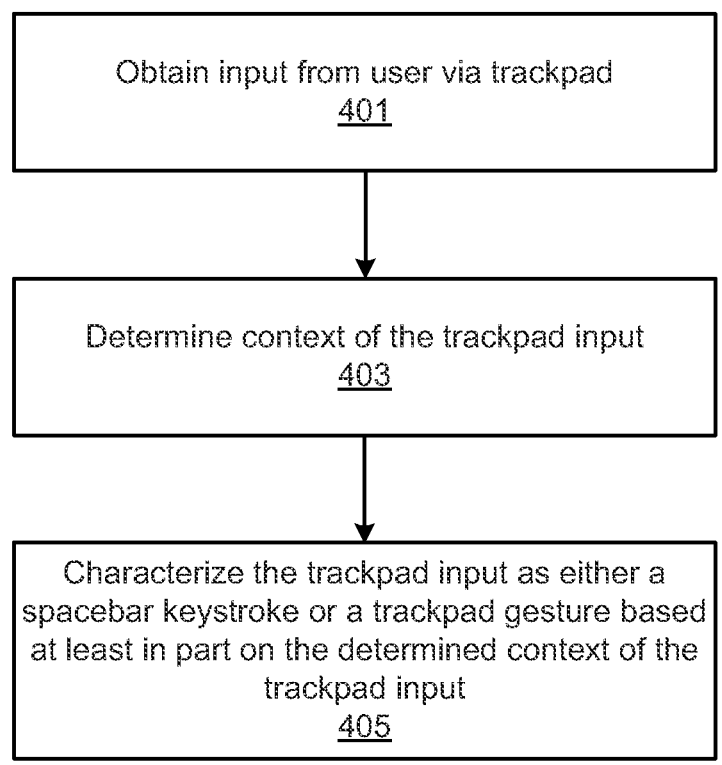
FIG. 4A is a flowchart illustrating example operations of the system of FIG. 1A.

FIG. 4A depicts a flowchart of a process 400, illustrating example operations of the system of FIG. 1A. This process 400 is an example embodiment of a process to handle user input to the system of FIG. 1A. Process 400 may include obtaining input to the trackpad surface (401). For example, the user 112 may provide input to the trackpad 102.

Process 400 includes determining the context of the trackpad input (403). For example, determining the context of the trackpad input may include determining whether the trackpad input contacted a spacebar region 108 of the trackpad 102, determining whether the trackpad input was a tap, a sliding motion or a dragging motion, determining whether the trackpad input activated a spring mechanism in the trackpad, determining an application context of the trackpad input, determining a text entry context of the trackpad input, or determining a duration of the trackpad input. The trackpad processor module 208, the keyboard processor module 210 and/or the CPU 214 may be used to determine the context of the trackpad input.

Process 400 includes characterizing the trackpad input as either a spacebar keystroke or a trackpad gesture based at least in part on the determined context of the trackpad input (405). For example, the trackpad processor module 208, the keyboard processor module 210 and/or the CPU 214 may be used to characterize the trackpad input as either a spacebar keystroke or a trackpad gesture. A trackpad gesture may include a tracking gesture, a click gesture and other types of gestures.

Figure 4B:
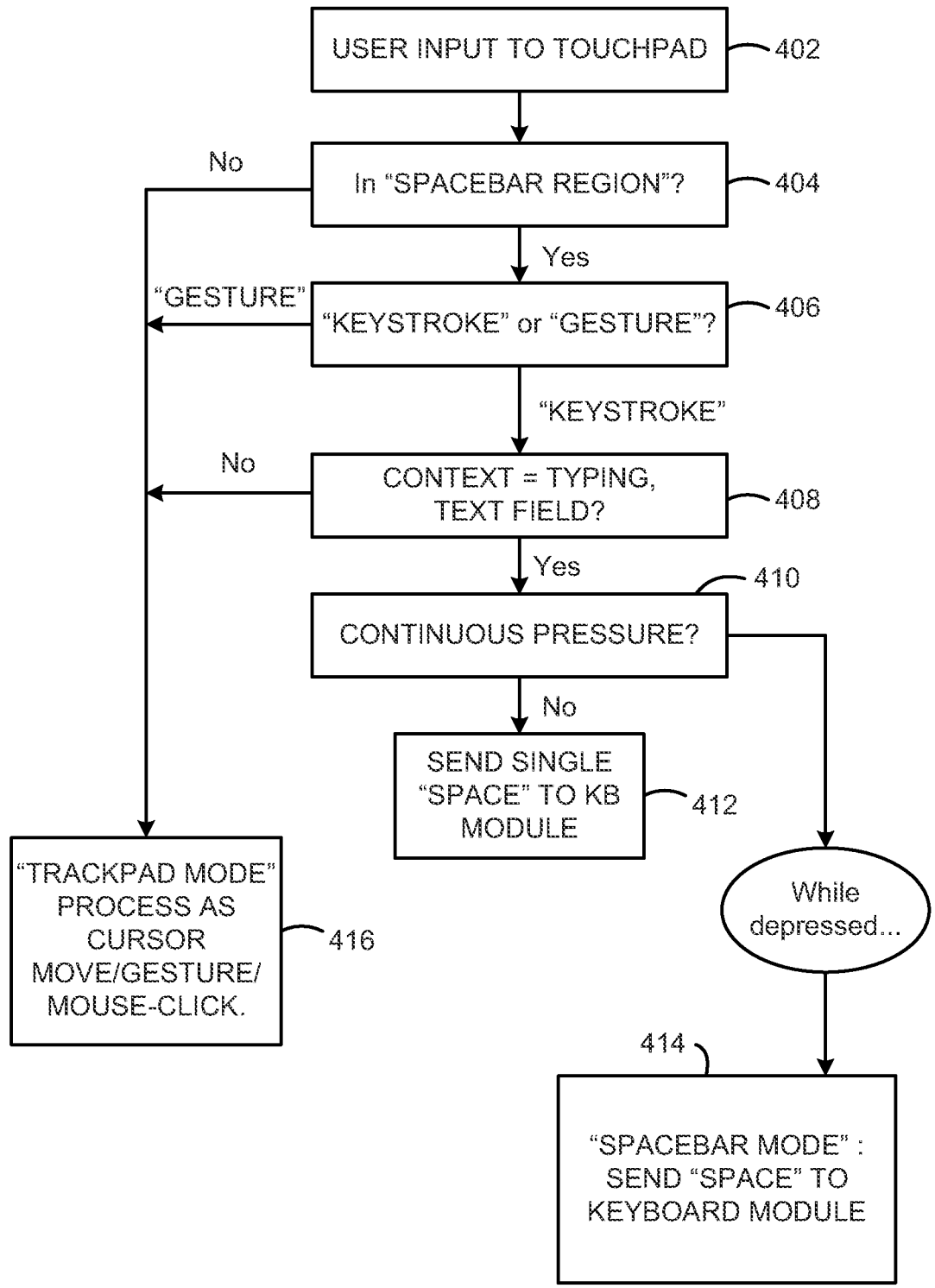
FIG. 4B is a flowchart illustrating example operations of the system of FIG. 1A.

FIG. 4B is a flowchart illustrating example operations of the system of FIG. 1A, in particular a possible process 450 for distinguishing spacebar keystrokes from trackpad input. Note that FIG. 4B depicts one possible implementation of the process 450, but that the steps of the process 450 can additionally be implemented in a different order than the order shown. The process depicted in FIG. 4B may be carried out, for example, in the trackpad processor module 208, if present, or in the keyboard processor module 210, if present, or in the CPU 214, if present, or by other means, such as, for example, by software or by a combination of the above.

The process 450 as depicted in FIG. 4B begins with input 402 to the trackpad 102 by the user 112. The input may be provided in the form of touching, tapping or pressing the surface of the trackpad 102 with a fingertip, or sliding or dragging one or more fingertips across the surface of the trackpad 102. For example, the user 112 may tap the trackpad 102.

Given the initial input 402, the process determines 404 whether the input 402 was applied to the spacebar region 108 of the trackpad 102. For example, the process may determine whether the input by the user 112 was a tap, touch, press, slide or drag located at least partly within the spacebar region 108 of the trackpad 102.

The process 450 determines 404 whether the input 402 was applied to the spacebar region 108. If the process 450 determines that the input 402 was not applied to the spacebar region 108, the input is passed to the trackpad input handler 416 to be processed as trackpad input. The trackpad input handler may be included within the same processor as the process 450, or the input may be passed to a separate processor such as the trackpad input processor 208 or the CPU 214.

If the process 450 determines 404 that the input 402 was applied to the spacebar region 108, the input is examined further within this process 450.

The process 450 determines 406 whether the input 402 was, for example, a "tap" or a "sliding movement." A "tap" in this context means any user 112 input 402 that could be interpreted as a keystroke, such as, for example, a tap, press, or press and hold action on the spacebar region 108 of the trackpad 102. A "sliding movement" in this context means any user 112 input 402 that could be interpreted as a mousing gesture, such as, for example, sliding or dragging one or more fingertips across the trackpad 102.

The spring 212, if present, could, for example, also be used to distinguish gestures from keystrokes in the input 402. For example, an input 402 that merely touched the spacebar region 108 of the trackpad 102 user interface layer 202 without activating the spring 112 may be considered a sliding movement. On the other hand, an input 402 that touched the spacebar region 108 of the trackpad 102 user interface layer 202 and also activated the spring 112 may be considered a tap.

In another exemplary implementation, force or pressure history may be used to distinguish gestures (e.g., a click gesture) from a keystroke in the input 402. A measure of the force over a period of time may be used to distinguish gestures from a keystroke in the input 402. For example, an input 402 that merely touched the spacebar region 108 of the trackpad 102 user interface layer 202 without meeting a threshold pressure or force level may be considered a click gesture. On the other hand, an input 402 that touched the spacebar region 108 of the trackpad 102 user interface layer 202 and met and/or exceeded a threshold pressure or force level may be considered a keystroke.

If the process 450 determines 406 that the input 402 was a sliding movement, then the input may be passed to the trackpad input handler 416 to be processed as trackpad input as described above.

If the process 450 determines 406 that the input 402 was a tap, then the input is examined further within this process 400.

The process 450 determines 408 the context of the input 402. The context of the input may be, for example: The application context, for example, what program is running or what window is currently active; the input context within the operating system or any currently active software window, for example, whether the user is typing in a text entry field, or moving the cursor around the display; or other measures of context. For example, a user who supplies the aforementioned input 402 to the trackpad 102 while typing a sentence in a word processing program would be operating in the context of text entry.

Other possible implementations of the process 450 exist wherein context is determined by other means. For instance, as opposed to examining the software context, which requires the process 450 to interface with the operating system to acquire information regarding active software programs and recent keystrokes, the process 450 may also distinguish between the text entry context and other contexts by the nature of the input 402. For example, a certain type, strength, or duration of input to the trackpad 102 user interface layer 202 may automatically be interpreted as falling within the text entry context, while other types of input may not. For example, a press or tap of sufficient pressure or sufficiently short duration may automatically be interpreted by the process 400 as being within the text entry context.

The spring 212, if present, could, for example, also be used to supply context information. For example, an input 402 that merely touched the spacebar region 108 of the trackpad 102 user interface layer 202 without activating the spring 112 may be considered to be not within the text entry context. On the other hand, an input 402 that touched the spacebar region 108 of the trackpad 102 user interface layer 202 and also activated the spring 112 may be considered to fall within the text entry context.

If the process 450 determines 408 that the input 402 is not supplied in the context of text entry, the input 402 may be passed to the trackpad input handler 416 to be processed as trackpad input as described above.

If the process 450 determines 408 that the input 402 is supplied in the context of text entry, this process 400 examines the input 402 further.

The process 450 determines 410 the duration of the input 402. For example, the input 402 may be short, for example a tap or click on the spacebar region 108 of the trackpad 102 user interface layer 202, or it may be long, for example a prolonged press on the spacebar region 108 of the trackpad 102 user interface layer 202. For example, the user 112 working in a word processing program might tap the spacebar region 108 of the trackpad 102 user interface layer 202, by, for example, touching the surface of the trackpad 102 briefly and then removing any pressure. This may be a short input. On the other hand, the user 112 working in a word processing program might press and hold the spacebar region 108 of the trackpad 102 user interface layer 202 for, for example, a second or more. This may be a long input.

If the process 450 determines 410 that the input 402 is short, then the process 400 may send a single space character 412 (or, for example, a single spacebar keystroke) to the system, for example, to the keyboard processor module 210 or the CPU 214 or by other means to the system so as to reflect the recognition of the input 402 by the user 112 as a press of the spacebar.

If the process 450 determines 410 that the input 402 is long, then the process 400 may send a series of space characters 414 (or, for example a series of spacebar keystrokes) to the system for the duration of the input, for example, to the keyboard processor module 210 or the CPU 214 or by other means to the system so as to reflect the recognition of the input 402 by the user 112 as a continued press of the spacebar.

FIG. 5A is an exemplary diagram of a system for acquiring user input for a computing device by means of a keyboard integrated with a spacebar, where the spacebar key of the keyboard 104 is configured to function as both a spacebar and a trackpad.

In this example implementation, the system 500 includes a display 106 and a keyboard 104, which includes a spacebar 502. The system 500 does not include a trackpad. The spacebar 502 may be present and may be positioned in its normal location relative to the keys of the keyboard 104, but in this example implementation the spacebar is configured to function as both a spacebar and a trackpad.

FIG. 5B is an exemplary diagram of the inset of FIG. 5A. Specifically, FIG. 5B depicts an inset region of the example system 500 in more detail. The spacebar 502 may include a user interface layer 504, a tracking layer 506 and wires 508, which function similarly to those described above in FIG. 2A.

In the example system 500, the system may be configured to function similarly to the example system 100, with the exception that in the system 500, the user 112 may input gestures or spacebar keystrokes to the spacebar 502, which is configured to function as a trackpad, as opposed to inputting those same gestures to the trackpad 102 which is configured to function as a spacebar, as depicted in FIGS. 1A and 1B.

Figure 6:
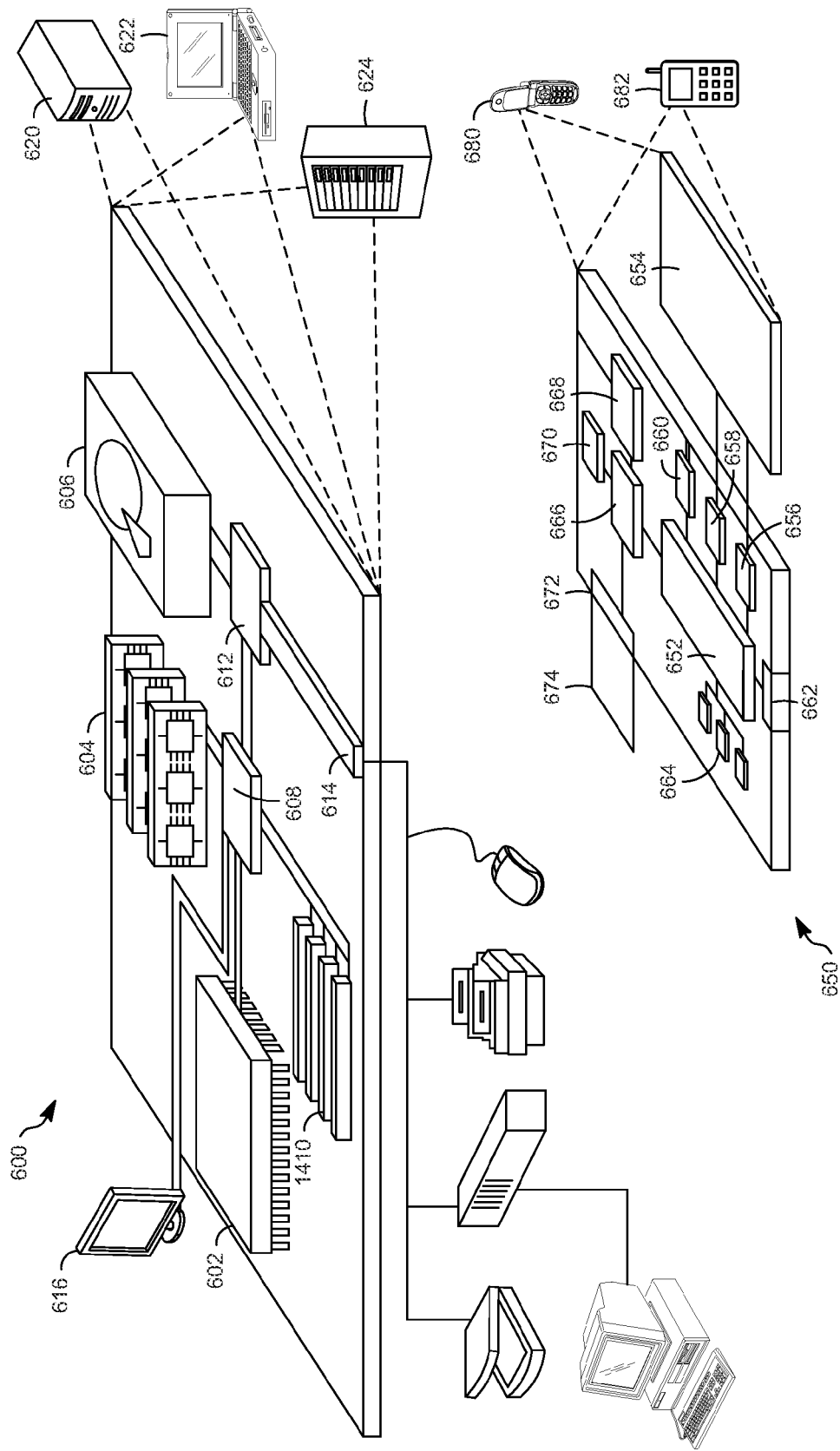
FIG. 6 depicts an example of a computer device and a mobile computer device that can be configured to implement the system and techniques described here.

FIG. 6 depicts an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 500. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also include instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may include one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 564 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product includes instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a trackpad or a mouse or a trackball, by which the user can provide input to the computer. Other kinds of devices can be configured to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus, comprising:
a keyboard without a key for a spacebar;
a trackpad, wherein any portion of the trackpad is configurable to function as the spacebar; and
a processor, wherein the processor is operably connected to the keyboard and the trackpad and the processor is configured to:

determine if an input to the trackpad includes a key press motion or a sliding motion, responsive to determining the input is a key press motion, register the input as a spacebar keystroke, and responsive to determining the input is a sliding motion, register the input as a tracking gesture.

2. The apparatus of claim 1 wherein a portion of the trackpad extends into a region for the spacebar on the keyboard and the portion of the trackpad is configured to function as the spacebar.

3. The apparatus of claim 1 wherein a top portion of the trackpad is profiled to simulate a shape of the spacebar.

4. The apparatus of claim 1 wherein a top portion of the trackpad extends into a region of the keyboard for the spacebar and comprises a switch set that is configured to function as the spacebar.

5. The apparatus of claim 1 wherein a bottom edge of the trackpad comprises a first switch that is configured to function as a left mouse button and a second switch that is configured to function as a right mouse button.

6. The apparatus of claim 1 wherein the trackpad further comprises one or more spring mechanisms.

7. The apparatus of claim 6 wherein the one or more spring mechanisms are positioned beneath a portion of the trackpad that is configured to function as the spacebar.

8. The apparatus of claim 1 wherein the trackpad further comprises a boundary delineating a top portion of the trackpad from a bottom portion of the trackpad.

9. The apparatus of claim 8 wherein the boundary comprises a visual indicator.

10. The apparatus of claim 8 wherein the boundary comprises a tactile indicator.

11. The apparatus of claim 8 wherein the boundary comprises a shelf.

12. The apparatus of claim 8 wherein the boundary comprises a ridge.

13. The apparatus of claim 8 wherein the boundary comprises a groove.

14. The apparatus of claim 1 wherein the processor is configured to:

determine if the input to the trackpad includes a tap motion, and responsive to determining the input is a tap motion, register the input as a mouse click.

15. The apparatus of claim 14 further comprising a keyboard controller module and a trackpad controller module, wherein the keyboard is connected to the keyboard controller module and the trackpad is connected to the trackpad controller module.

16. An apparatus, comprising:

a keyboard including a spacebar, wherein the any portion of the spacebar is configurable to function as a trackpad; and a processor, wherein the processor is operably connected to the keyboard and the processor is configured to:

determine if an input to the spacebar includes a key press motion or a sliding motion, responsive to determining the input is a key press motion, register the input as a spacebar keystroke, and responsive to determining the input is a sliding motion, register the input as a tracking gesture.

17. The apparatus of claim 16 wherein the processor is configured to:

determine if the input to the spacebar includes a tap motion, and responsive to determining the input is a tap motion, register the input as a mouse click.

18. A method including executing instructions recorded on a non-transitory computer-readable storage media using at least one processor, the method comprising:

obtaining an input on a device from a user via a trackpad, wherein the device includes a keyboard without a key for a spacebar and any portion of the trackpad is configurable to function as the spacebar;

determining if the trackpad input includes a key press motion or a sliding motion;

responsive to determining the trackpad input is a key press motion, registering the trackpad input as a spacebar keystroke; and responsive to determining the trackpad input is a sliding motion, registering the trackpad input as a trackpad gesture.

19. The method of claim 18 wherein the trackpad gesture comprises a tracking gesture.

20. The method of claim 18 wherein the trackpad gesture comprises a click gesture.

21. The method of claim 18, further comprising:

determining a context of the trackpad input including determining whether the trackpad input contacted a spacebar region of the trackpad; and registering the trackpad input as a spacebar keystroke based at least in part on the determined context of the trackpad input.

22. The method of claim 18, further comprising:

determining a context of the trackpad input including determining whether the trackpad input included a tap motion; and registering the trackpad input as a click gesture based at least in part on the determined context of the trackpad input.

23. The method of claim 18, further comprising:

determining a context of the trackpad input including determining whether the trackpad input activated a spring mechanism in the trackpad; and registering the trackpad input as a spacebar keystroke based at least in part on the determined context.

24. The method of claim 18, further comprising:

determining a context of the trackpad input including determining whether the trackpad input included a continuous pressure on the trackpad; and registering the trackpad input as a trackpad gesture based at least in part on the determined context.

25. The method of claim 18, further comprising:

determining a context of the trackpad input including determining an application context of the trackpad input; and registering the trackpad input as a spacebar keystroke or a trackpad gesture based at least in part on the determined application context.

26. The method of claim 18, further comprising:

determining a context of the trackpad input including determining a text entry context of the trackpad input; and registering the trackpad input as a spacebar keystroke or a trackpad gesture based at least in part on the determined text entry context.

27. The method of claim 18, further comprising:

determining a context of the trackpad input including determining a duration of the trackpad input; and registering the trackpad input as a spacebar keystroke or a trackpad gesture based at least in part on the determined duration of the trackpad input.

28. A recordable storage device having recorded and stored thereon instructions that, when executed, perform the actions of:
- obtaining an input on a device from a user via a trackpad, wherein the device includes a keyboard without a key for a spacebar and any portion of the trackpad is configurable to function as the spacebar;
- determining if the trackpad input includes a key press motion or a sliding motion;
- responsive to determining the trackpad input is a key press motion, registering the trackpad input as a spacebar keystroke; and
- responsive to determining the trackpad input is a sliding motion, registering the trackpad input as a trackpad gesture.

29. The recordable storage device of claim 28, further comprising:
- determining a context of the trackpad input including determining whether the trackpad input contacted a spacebar region of the trackpad; and
- registering the trackpad input as a spacebar keystroke based at least in part of the determined context of the trackpad input.

30. The recordable storage device of claim 28, further comprising:
- determining a context of the trackpad input including determining whether the trackpad input activated a spring mechanism in the trackpad; and
- registering the trackpad input as a spacebar keystroke based at least in part on the determined context.

* * * * *